US009654732B2

(12) United States Patent
Block et al.

(10) Patent No.: US 9,654,732 B2
(45) Date of Patent: May 16, 2017

(54) SYSTEMS AND METHODS OF DISTRIBUTION OF LIVE STREAMING VIDEO FEEDS TO AND FROM VIDEO CALLERS DURING A VIDEO COLLABORATION SESSION

(71) Applicant: INFOCUS CORPORATION, Portland, OR (US)

(72) Inventors: Frederick P. Block, Westminster, CO (US); Brady O. Bruce, San Francisco, CA (US); Devon Wright, Fremont, CA (US); Stanislav Angelov, Pleasanton, CA (US)

(73) Assignee: INFOCUS CORPORATION, Portland, OR (US)

( * ) Notice: Subject to any disclaimer, the term of this patent is extended or adjusted under 35 U.S.C. 154(b) by 0 days.

(21) Appl. No.: 14/457,004

(22) Filed: Aug. 11, 2014

(65) Prior Publication Data

US 2016/0044279 A1    Feb. 11, 2016

(51) Int. Cl.
*H04N 7/15* (2006.01)
*H04L 29/06* (2006.01)
*G06Q 10/10* (2012.01)
*H04L 12/18* (2006.01)

(52) U.S. Cl.
CPC .......... *H04N 7/152* (2013.01); *G06Q 10/101* (2013.01); *H04L 12/1813* (2013.01); *H04L 65/1069* (2013.01); *H04L 65/1093* (2013.01); *H04L 65/4038* (2013.01)

(58) Field of Classification Search
CPC .......... H04N 7/14; H04N 7/141; H04N 7/142; H04N 7/144; H04N 7/147; H04N 7/148; H04N 7/15; H04N 7/152; H04N 7/155; H04N 21/2187; H04N 7/18; H04N 7/181; H04N 7/183; G08B 13/19656
See application file for complete search history.

(56) References Cited

U.S. PATENT DOCUMENTS

| 6,233,428 | B1 * | 5/2001 | Fryer | G09B 5/02 |
| | | | | 434/308 |
| 8,773,532 | B2 * | 7/2014 | Wengrovitz | H04N 7/181 |
| | | | | 348/143 |
| 2006/0164508 | A1 * | 7/2006 | Eshkoli | H04N 7/147 |
| | | | | 348/14.09 |
| 2007/0050828 | A1 * | 3/2007 | Renzi | H04N 7/141 |
| | | | | 725/93 |
| 2007/0288562 | A1 * | 12/2007 | Shaffer | G06Q 10/107 |
| | | | | 709/204 |

(Continued)

*Primary Examiner* — Stella Woo
(74) *Attorney, Agent, or Firm* — McCoy Russell LLP

(57) ABSTRACT

The technology disclosed further relates to distribution of live streaming sources during a video collaboration session. In particular, it relates to receiving or placing an outside call from or to at least one remote limited participant to be joined with an ongoing video collaboration session on a display wall that combines multiple live streaming sources, locating a template that identifies at least one live streaming source selected from the ongoing video collaboration session to transmit to the remote limited participant, and causing a copy of the selected live streaming source to be directed to the remote limited participant upon connection to the ongoing video collaboration session.

20 Claims, 9 Drawing Sheets

(56) References Cited

U.S. PATENT DOCUMENTS

| | | | | |
|---|---|---|---|---|
| 2011/0271332 A1* | 11/2011 | Jones | .................... | H04L 9/3247 |
| | | | | 726/7 |
| 2012/0257002 A1* | 10/2012 | Stocker | ............... | H04M 7/0024 |
| | | | | 348/14.08 |
| 2013/0336170 A1* | 12/2013 | Broadworth | .......... | H04L 65/403 |
| | | | | 370/260 |
| 2014/0139609 A1* | 5/2014 | Lu | ........................... | H04N 7/15 |
| | | | | 348/14.03 |
| 2014/0267550 A1* | 9/2014 | Nimri | .................... | H04N 7/152 |
| | | | | 348/14.03 |

\* cited by examiner

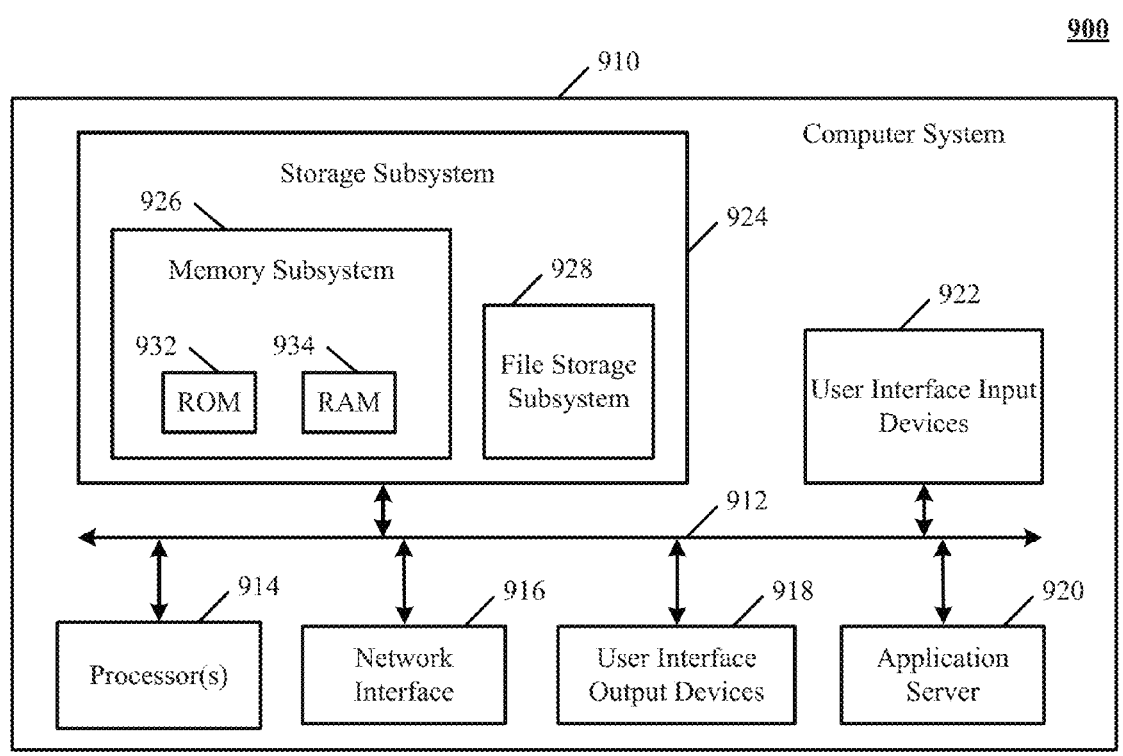
FIG. 9 – Computer System

SYSTEMS AND METHODS OF DISTRIBUTION OF LIVE STREAMING VIDEO FEEDS TO AND FROM VIDEO CALLERS DURING A VIDEO COLLABORATION SESSION

RELATED APPLICATION

This application is related to U.S. patent application Ser. No. 14/465,534 entitled "SYSTEMS AND METHODS OF INCORPORATING LIVE STREAMING SOURCES INTO A VIDEO CONFERENCE," filed contemporaneously. The related application is incorporated by reference for all purposes.

INCORPORATION

Following material is incorporated by reference in this filing:

"CONCURRENT DECOMPRESSION OF MULTIPLE VIDEO STREAMS WITH CONSTRAINED DECOMPRESSION RESOURCES", U.S. Prov. application Ser. No. 13/828,619, filed 14 Mar. 2013.

FIELD OF THE TECHNOLOGY DISCLOSED

The technology disclosed generally relates to video collaboration systems, and in particular implementations, to distributing broadcasts of live video feeds to and from video callers during video collaboration sessions.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Video collaboration systems provide an interactive environment for users at different locations to discuss problems and work collaboratively. During a video collaborative session, local and remote participants participate in varying levels at varying times and multiple working groups. Therefore, it becomes imperative to provide the broadest possible access during a video collaboration session so that relevant video information can be simultaneously manipulated responsive to respective needs and situations of the different local and remote participants.

Moreover, the digital video revolution has led to rampant use of video enabled devices, such as desktop and laptop clients, smartphones and tablet computers. In addition to voice calls, video enabled devices provide the ability to make and receive video calls from and to anyone, anywhere, at any time. In the course of conducting a video collaborative session using a video call from a video enabled device, the video enabled device transmits and receives video information to and from other parties in the video collaborative session.

However, existing video collaborative systems are very restricted with regards to video clients, with interoperation with mainstream video calling devices yet to be introduced in the video collaboration realm. Therefore, an opportunity arises to provide systems and methods that enable efficient and effective distribution of live video feeds to and from video callers during a video collaboration session. Improved user experience and engagement and higher customer satisfaction and retention may result.

SUMMARY

The technology disclosed further relates to distribution of live streaming sources during a video collaboration session. In particular, it relates to receiving an outside video call from at least one remote limited participant to be joined with an ongoing video collaboration session that combines multiple live streaming sources, locating a template that identifies whether and where the live video stream from the remote limited participant will be presented within the video collaboration session and which, if any, live streaming sources selected from the ongoing video collaboration session to transmit to the remote limited participant, and causing a copy of the selected live streaming sources to be directed to the remote limited participant upon connection to the ongoing video collaboration session.

The technology disclosed also relates to initiating an outbound video call to at least one remote limited participant to be joined with an ongoing video collaboration session on a display wall that combines multiple live streaming sources, locating a template that identifies whether and where the live video stream from the remote limited participant will be presented within the video collaboration session and which, if any, live streaming sources selected from the ongoing video collaboration session to transmit to the remote limited participant, and causing a copy of the selected live streaming sources to be directed to the remote limited participant upon connection to the ongoing video collaboration session in response to the outbound call.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 9 is a block diagram of an example computer system to distribute live video feeds during a video collaboration session.

DESCRIPTION

Introduction

Figure 1:
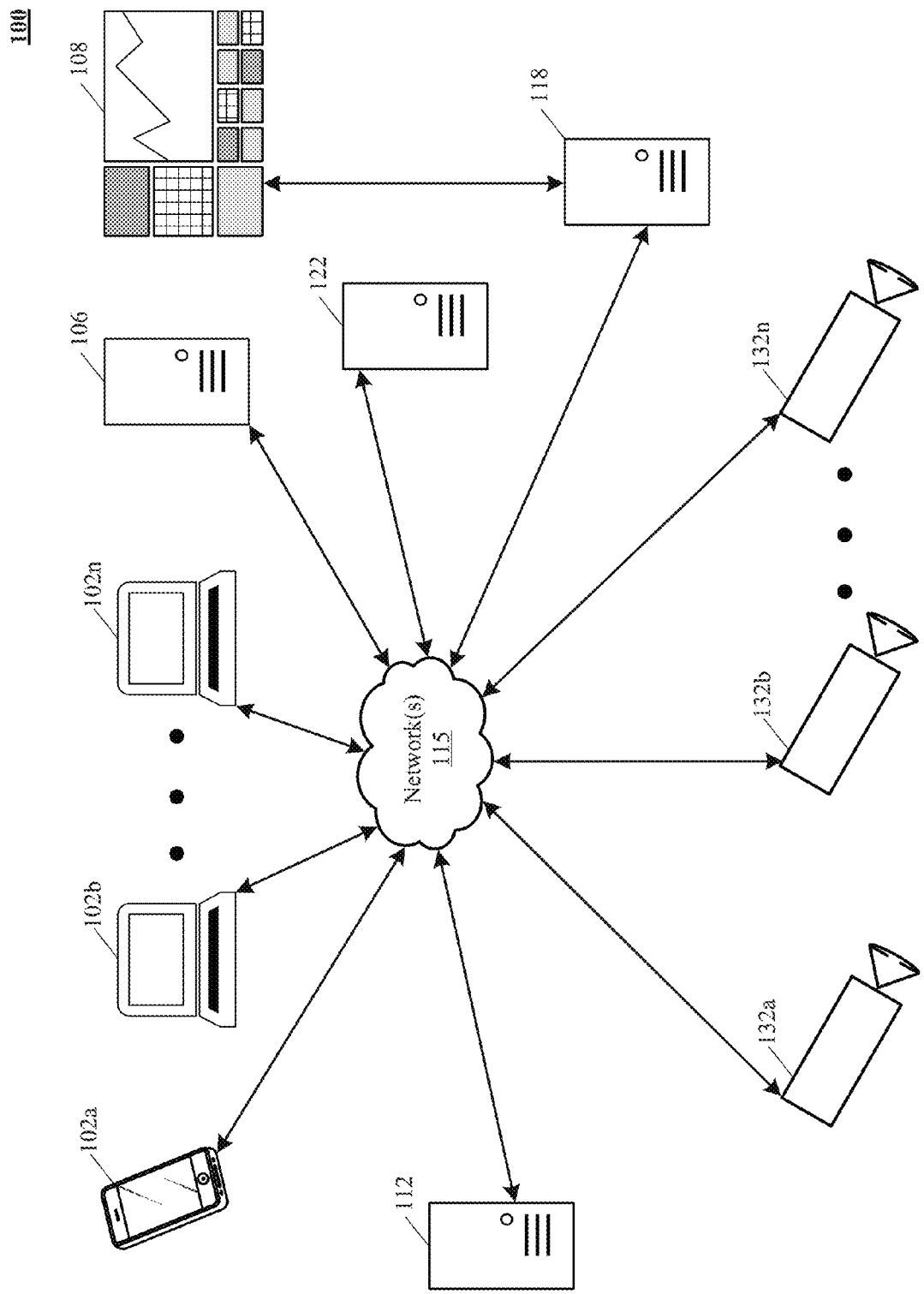
FIG. 1 illustrates an exemplary video collaboration environment.

Many devices, such as laptops, desktops, smartphones, and tablet computers, can act as video calling endpoints. However, although video collaboration systems support a variety of video sources, including video upload and download from and to these systems' desktop, laptop, or mobile clients, these systems are historically "closed" systems allowing no access from standard video telephony devices.

Furthermore, existing video collaboration products, such as Jupiter System's Canvas, allow the users to participate in collaborative sessions involving display walls with many video stream screens. In these collaborative sessions the users can access multiple live video streams using a personal computer (PC) or mobile client. The technology disclosed enhances the video collaboration system by allowing users to participate in a video collaboration session through a standard video call such that live streaming sources can directed from a video collaboration session to remote participants and from the remote participants to the video collaboration session using standard video calling technology.

Therefore, the technology disclosed solves the technical problem of allowing video callers to participate in a video collaboration environment by allowing live video from a video telephone call, initiated by a remote video caller, to be used as a video source in the video collaboration environment and also allowing live video from the video collaboration environment to be made available to the remote caller.

According to one implementation, this is achieved by creating a gateway that on one side acts to video callers like a collection of video telephony endpoints, and on the other side simultaneously provides the video streams from the callers to the video collaboration environment and fetches video streams from the video collaboration environment to present as the other end of the video calls.

"Live streaming sources" of a video collaboration session provide real-time video monitoring of a region of interest, according to one implementation. Some other implementations include the live streaming sources of a video collaboration session being information sources that broadcast unidirectional live video feeds.

"Remote limited participants" of a video collaboration session are users that do not have complete access to the different live streaming sources used in the video collaboration session. For example, in a display wall based video collaboration session, such as one hosted by Jupiter System's Canvas product, remote users do not have full access to the live video feeds broadcasted across the different display screens of the display wall unless they are using the system's native client. The technology disclosed allows remote users with video enabled devices capable of making or receiving video calls to have limited access to these video feeds, and also allows video feeds from these users to be viewed within the video collaboration environment. In this example, such remote users may have a limited perspective on what is transmitted by the live streaming sources because they are not trusted users of the video collaboration system, but rather any old "man in the street". Thus, the technology disclosed can be applied to distribute video feeds from the live streaming sources to and upload video from the video enabled devices of the different remote users i.e. remote limited participants.

The technology disclosed further relates to distribution of live streaming sources during a video collaboration session. In particular, it relates to receiving an outside video call from at least one remote limited participant to be joined with an ongoing video collaboration session that combines multiple live streaming sources, locating a template that identifies whether and where the live video stream from the remote limited participant will be presented within the video collaboration session and which, if any, live streaming sources selected from the ongoing video collaboration session to transmit to the remote limited participant, and causing a copy of the selected live streaming sources to be directed to the remote limited participant upon connection to the ongoing video collaboration session.

The technology disclosed also relates to initiating an outbound video call to at least one remote limited participant to be joined with an ongoing video collaboration session on a display wall that combines multiple live streaming sources, locating a template that identifies whether and where the live video stream from the remote limited participant will be presented within the video collaboration session and which, if any, live streaming sources selected from the ongoing video collaboration session to transmit to the remote limited participant, and causing a copy of the selected live streaming sources to be directed to the remote limited participant upon connection to the ongoing video collaboration session in response to the outbound call.

The technology disclosed further includes designating a particular live streaming source for immediate broadcast to the remote limited participant by dragging an interface object representing the outside call from the remote limited participant and dropping the interface object on an interface window used to stream the live streaming source.

According to one implementation, disseminating particular live streaming sources to specific remote participants of a video collaboration session can aid in the rapid resolution of on-field issues. Therefore, the technology disclosed can be applied in numerous different scenarios, including emergency responses for which dispatch centers have access to fixed cameras in the areas associated with the emergencies via a video collaboration product like Canvas. In this example, the dispatch centers can use the technology disclosed to receive live video of the emergency sites from people at the emergency sites i.e. boots on the ground. In one implementation, the live video from the emergency sites can be displayed as part of a video collaboration session between members at the dispatch center and experts reached via video call at remote locations (not the emergency sites) who can assist in resolving the emergencies.

In another example, the technology disclosed can be used for training purposes. For instance, a company can utilize the technology disclosed to offer a training course that requires remote trainees to view multiple live video feeds of an on-field procedure. In one implementation, a video call can be made to the trainees to join a video collaboration session that displays the multiple live video feeds. As a result, the trainees can access the live video feeds from their respective video enabled devices. In another implementation, the trainees can use their video enabled devices to call and join the video collaboration session hosting the multiple live video feeds.

In yet another example, the technology disclosed can be used by parents to remotely monitor their children at day care facilities. For instance, a parent can make a video call to a day care facility equipped with cameras and a video collaboration product. Further, the facility's operator can find the appropriate camera view showing the parent's child and share the specific view with the caller parent.

The technology disclosed relates to distributing broadcasts of live video feeds during video collaboration sessions by using computer-implemented systems. The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed allows users to incorporate live streaming sources from video callers into a video collaboration session and allows video callers to access live streaming sources within video collaboration sessions. Examples of systems, apparatus, and methods according to the disclosed implementations are described in a "video collaboration" context. The examples of "video collaboration" are being provided solely to add context and aid in the understanding of the disclosed implementations. In other instances, examples of live video feed distribution in other contexts like video conferences, video calls, video chats, etc. may be used. Other applications are possible, such that the following examples should not be taken as definitive or limiting either in scope, context, or setting. It will thus be apparent to one skilled in the art that implementations may be practiced in or outside the "video collaboration" context.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Video Collaboration Environment

FIG. 1 illustrates an exemplary video collaboration environment 100. FIG. 1 includes user computing devices 102a-n, security server 106, display wall processor 118, and display wall 108. FIG. 1 also shows video telephony gateway 112, network(s) 115, visual collaboration server 122, and cameras 132a-n. In other implementations, environment 100 may not have the same elements or components as those listed above and/or may have other/different elements or components instead of, or in addition to, those listed above, such as an on-demand database service, network interface, or application platform. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Servers (106, 112, 118, 122) can be of varying types including a workstation, server, computing cluster, blade server, server farm, or any other data processing system or computing device. In some implementations, each server (106, 112, 118, 122) can be communicably coupled to user computing devices 102a-n and cameras 132a-n via a different network connection. For example, video telephony gateway 112 can be coupled via the network(s) 115 (e.g., the Internet), security server 106 can be coupled via a direct network link, and visual collaboration server 122 can be coupled by yet a different network connection.

User computing devices 102a-n can be desktop personal computers, laptop computers, tablet computers, smartphones, personal digital assistants (PDA), digital image capture devices, cell phones, or any wireless access protocol (WAP) enabled devices or any other computing devices capable of interfacing directly or indirectly to the Internet or other network connection. User computing devices 102a-n can run an HTTP client, e.g., a browsing program, such as Microsoft's Internet Explorer browser, Mozilla's Firefox browser, Opera's browser, Google's Chrome, or a WAP-enabled browser in the case of a cell phone, PDA or other wireless device, or the like, allowing a participant of a video collaboration to access, process and view information, pages and applications available to it from environment 100 over network(s) 115.

User computing devices 102a-n also include one or more user interface devices, such as a keyboard, a mouse, trackball, touch pad, touch screen, pen or the like, for interacting with a video collaboration interface in conjunction with pages, forms, applications and other information provided by environment 100 or other systems or servers. For example, the user interface device can be used to schedule conferences, perform selections, access data and applications hosted by environment 100, and to perform searches on stored data, and otherwise allow a video collaboration participant to interact with various video interface pages.

When conducting a video collaboration session, cameras 132a-n can serve as live streaming sources such that live video feed (i.e. both audio and image information) from the cameras 132a-n can be used as the image or video source for the video collaboration session. In some implementations, cameras 132a-n can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For instance, cameras 132a-n can be surveillance cameras or private cameras mounted on a structure, such as a building or utility pole. In another example, cameras 132a-n can be embedded in user computing devices 102a-n described above or can be peripheral devices capable of streaming video.

In some implementations, user computing devices 102a-n and cameras 132a-n can communicate with the different servers and processors (106, 112, 118, 122) using TCP/IP (Transfer Control Protocol and Internet Protocol) network and, at a higher network level, use other common Internet protocols to communicate, such as HTTP, FTP, AFS, WAP, etc.

In an example where HTTP is used, devices 102a-n and cameras 132a-n can include an HTTP client for sending and receiving HTTP messages to and from an HTTP server in environment 100. Such an HTTP server can be implemented as the sole network interface between the different servers and processors and network(s) 115, but other techniques can be used as well or instead. In some implementations, the interface between the different servers and processors and network(s) 115 includes load sharing functionality, such as round-robin HTTP request distributors to balance loads and distribute incoming HTTP requests evenly over a plurality of servers.

Environment 100 also implements a display wall 108, controlled by a display wall processor 118 such as Jupiter Systems' Fusion Catalyst. Display wall 108 advances end-to-end collaboration between participants of a video collaboration such that remote limited participants can share streams from live streaming sources (cameras 132a-n) broadcasted on the display wall 108, both as sources and as destinations.

In one implementation, packet-switching technology can be used to show any information source on the display wall 108, such as a single window spanning multiple screens in the display wall 108 or as separate windows individually presented across different screens in the display wall 108. In one implementation, display wall processor 118 supports client software applications as well as provides related data, code, forms, webpages and other information to and from user computing devices 102a-n and cameras 132a-n.

Video telephony gateway 112 plays the role of routing during the video collaboration sessions hosted by the video collaboration environment 100. Video telephone gateway 112 parses a received request to identify the source and destination of the request. Once identified, the request is transmitted to the destination with an indication of the source for evaluation by the recipient. In some implementations, it ensures that a request is sent to the requested destination i.e. participant, live streaming source, and/or remote limited participant. In other implementations, it receives inbound calls from remote participants of a video collaboration and forwards them as queries to the security server 106 and/or visual collaboration server 122 for further processing.

According to one implementation, video telephony gateway 112 includes a SIP Signaling Interface (SSI) that supports different video calls, including SIP to SIP, SIP to H.323, SIP to SCCP, SIP intercluster trunk, H.323 trunk, or combination of SIP and H.323 trunk. In some implementations, video telephony gateway 112 includes RTP (Real Time Transport Protocol), which defines a standard packet format of delivering audio and video over the network 115 between the participants, live streaming sources, and/or remote limited participants.

Yet other implementations include the video telephony gateway 112 serving as a SIP registrar that receives registration of remote participants of a video collaboration prior to initiation of video calls. In other implementations, it applies call-routing policies that define sequence of events during a video collaboration and/or authentication and authorization of participants to services hosted by the video collaboration. In yet other implementations it registers as one or more SIP endpoints to an external SIP registrar allowing calls to be initiated from and to the video telephony gateway. In another implementation it supports inbound and outbound calls through a SIP trunk interface.

Visual Collaboration server 122 configures and controls the streaming of video sources and arrangement of video collaboration interfaces during the video collaboration sessions organized using the video collaboration environment 100. In one implementation, visual collaboration server 122 directs live streaming sources to one or more remote limited participants of a video collaboration session. In another implementation, visual collaboration server 122 stores templates used by the video telephony gateway 122 to determine whether the live video stream from the remote limited participant will be presented within any video collaboration sessions and which, if any, live streaming sources selected from any ongoing video collaboration sessions to transmit to the remote limited participant. In yet another implementation, visual collaboration server 122 generates for display interface elements such as scrolls bars for navigating a video collaboration interface, drag and drop functions for accepting or terminating video calls, and/or arranging and manipulating live stream windows within a video collaboration interface.

Security server 106 ensures minimum security risk during the video collaboration sessions conducted by the video collaboration environment 100. In one implementation, security server 106 executes a Network Authentication Process (NAP) that gathers user credentials such as usernames and passwords from all participants of a video collaboration session and forwards them to an LDAP (Lightweight Directory Access Protocol) server, requesting additional authentication values such as role, realm, domain, or context for the participants. Once the access information is extracted from the LDAP module, it is parsed by the NAP to identify specific values needed. The parsed value is then used when passing the participant credential's to an authentication module, which either grants or rejects participation of the participants in the video collaboration session. In one implementation authentication information from video calls processed by video telephony gateway 112 is parsed by the NAP to identify the calling party as a full, not limited, participant within the visual collaboration system, and to allow the calling party access to live video streams within the visual collaboration sessions.

Some implementations include the authentication module allowing remote limited participants restricted access to the video collaboration session by authorizing viewing of live streams from only a subset of live streaming sources of the video collaboration. In such an implementation, video feeds from restricted live streaming sources of the video collaboration session are blanked out for the unauthorized remote limited participants of the video collaboration session.

Video Collaboration Session

Figure 2:
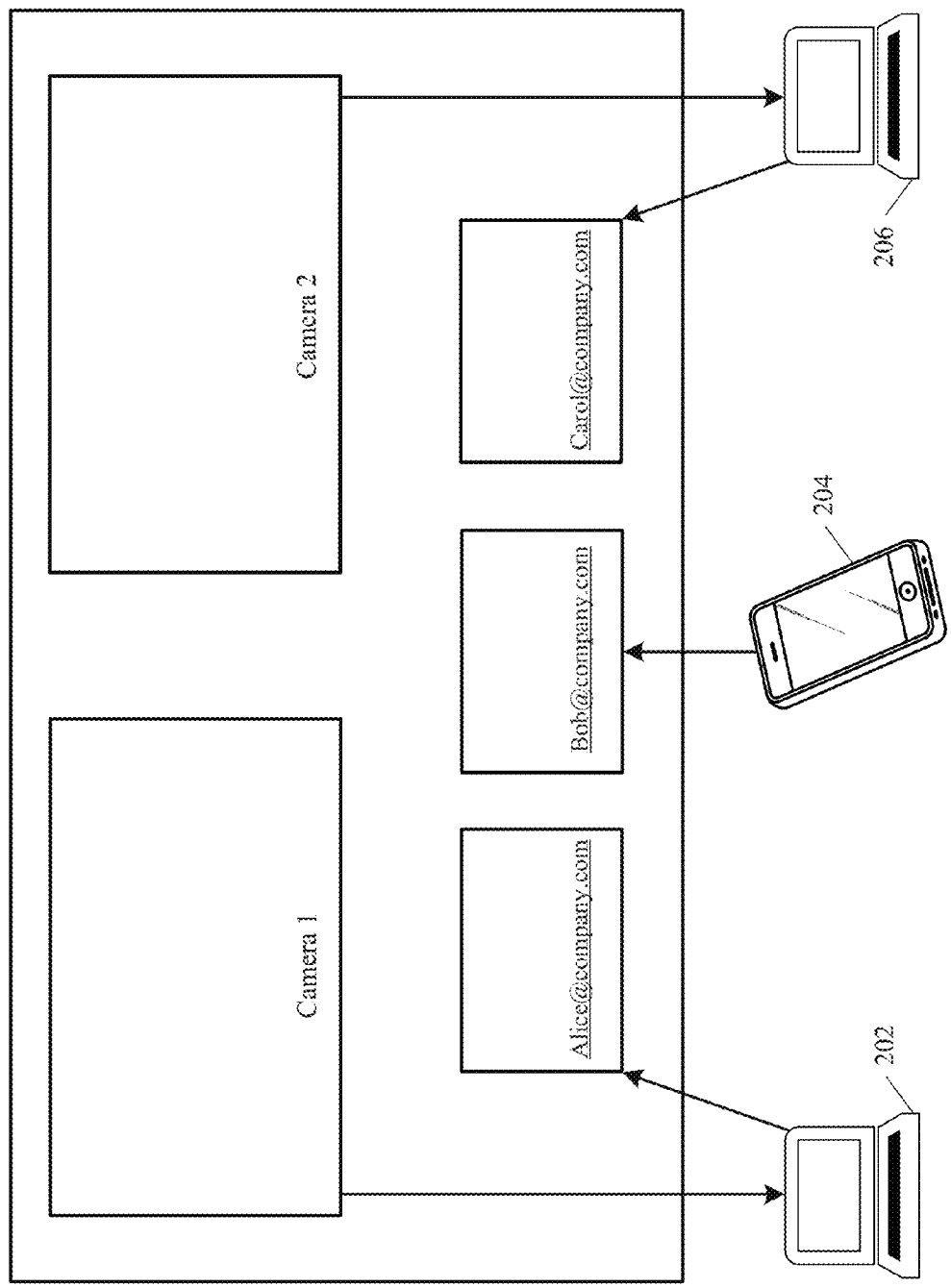
FIG. 2 depicts one implementation of a video collaboration session in which live streaming sources are transmitted to remote limited participants of the video collaboration session.

FIG. 2 depicts one implementation of a video collaboration session 200 in which live streaming sources are transmitted to remote limited participants of the video collaboration session 202 (Alice), 204 (Bob) and 206 (Carol). As shown in FIG. 2, live video feeds from cameras 1 and 2 of the video collaboration 200 are transmitted to respective remote participants 202 and 206. In one implementation, the remote participants 202 and 206 can specify a telephony address of the video collaboration session 200 such that once the call is connected, a live video stream from a particular video collaboration session 200 is transmitted to the caller. In another implementation the caller's live video stream becomes part of the video collaboration session.

In some implementations, the telephony address of the video collaboration session 200 can be a SIP (Session Initiation Protocol) address like "sip:collaborationsession@company.com." In some implementations which, if any, live video stream is transmitted to the remote participants and whether the live video stream from the remote participants becomes part of the video collaboration session can be controlled by information previously associated with the visual collaboration session. In some implementations this information can be stored in the form of a template (in memory or on disk) by the video collaboration server. In some implementations which, if any, live video stream is transmitted to a remote participant and whether the live video stream from the remote participant becomes part of the video collaboration session can be specified based on both the called address and other information associated with the telephony call, such as the calling party ID of the limited remote participant. In other implementations, the telephony address called by the remote limited participant can belong to a specific destination video source such as a SIP address like "sip:collaborationsession!camera1@company.com" or "sip:collaborationsession@company.com; video=camera2." In yet other implementations a destination telephony address can allow a remote participant to directly view live transmission from the destination source like cameras 1 and 2, without participating in a video collaboration session 200 by using a SIP address such as "sip:camera1@company.com".

In other implementations, video feed from the remote participants 202 and 206 is incorporated in the video collaboration session 200, as depicted in FIG. 2 by windows labelled "Alice@company.com," "Bob@company.com," and "Carol@company.com." Thus, a two-way collaborative exchange of upstream and downstream video feeds is established for these remote limited participants and other full participants in the visual collaboration session can view the live video streams from both of these remote limited participants. In yet other implementations, only a one-way upstream link is established in which video feed only from a remote participant like participant 204 is streamed into the video collaboration session 200, without any transmission of video feeds from the live streaming cameras 1 and 2 downstream to the remote participant.

In yet other implementations, which live video stream from a visual collaboration session is transmitted to remote participants and whether the live video stream from remote participants becomes part of the video collaboration session can be controlled dynamically by full participants of the video collaboration session. In some implementations, this dynamic control can be a drag and drop function such that dragging and dropping an image, representing the remote participant, onto a window of live video feed of a live streaming camera results in immediate transmission of the live video feed to the remote participants. In some implementations, this dynamic control can be limited to certain participants based on permissions associated with a role defined for the participant. In other implementations, this dynamic control can override which live video stream is being transmitted to the remote participant and whether the live video stream from the remote participant is part of the video collaboration session, for example as determined when the call is completed by mechanisms as described above.

Figure 3:
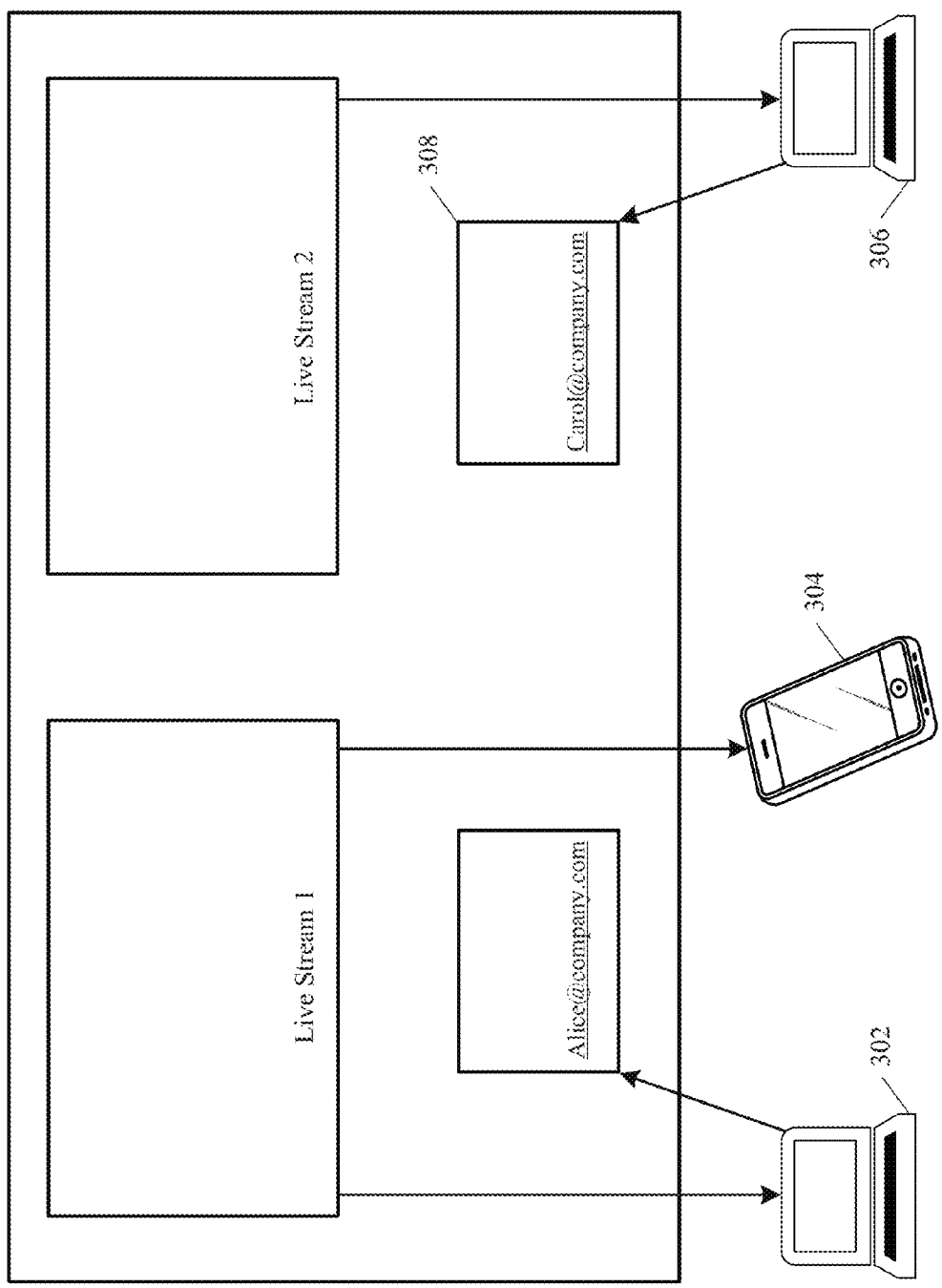
FIG. 3 is one implementation of a video collaboration session in which a single live streaming source is transmitted to multiple remote limited participants of the video collaboration session.

FIG. 3 is one implementation of a video collaboration session in which a single live streaming source (Live Stream 1) is transmitted to multiple remote limited participants (302, 304) of the video collaboration session 300. In one implementation, a global telephony address, such as "productgroup@company.com," can be used by a group of remote participants to initiate a call and then the live video stream from a particular live streaming video source is broadcast to each participant in the group. In some implementations, a remote limited participant 306 can be called and after the call is established live video from a collaboration session 300 transmitted to the remote participant and the live video stream from the remote participant included in the video collaboration session. In some implementations, an outbound call of this nature can be initiated by a full participant by entering a SIP address in a field 308 associated with the window where the remote participant's video stream will be displayed. In some implementations the participants permitted to initiate outbound calls can be restricted based on permissions associated with a role defined for the participant. In other implementations the remote limited participants able to be called can be restricted based on a "white list" of allowed addresses or "black list" of disallowed addresses.

Figure 4:
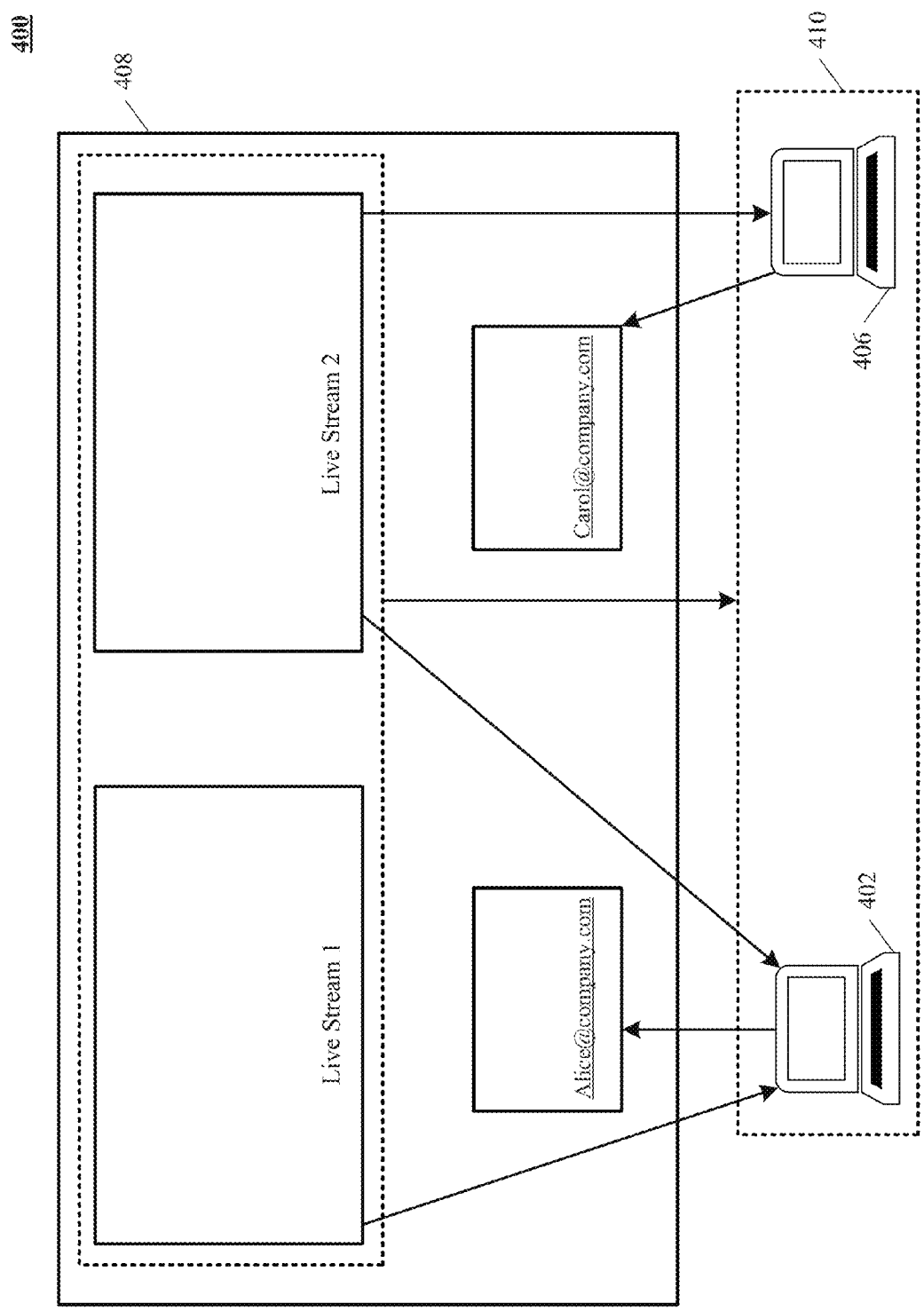
FIG. 4 illustrates one implementation of a video collaboration session in which multiple live streaming sources are transmitted to a single remote limited participant of the video collaboration session.

FIG. 4 illustrates one implementation of a video collaboration session 400 in which multiple live streaming sources (Live Stream 1, Live Stream 2 are transmitted to a single remote limited participant 402 of the video collaboration session 400. In other implementations, video feeds from a group of live streaming sources 408 of a video collaboration session 400 can be transmitted to a group of remote limited participants 410 of the video collaboration session 400. In one implementation, a global telephony address of the video collaboration session 400, such as "sip:collaboration@company.com," can be used to initiate a group call and broadcast live video streams from each camera (Live Stream 1, Live Stream 2) in the sources group 408 to each remote limited participant in the group 410.

Regarding the SIP address, SIP is a signaling protocol used to control communication sessions over Internet Protocol (IP). SIP is an application layer protocol and can be run on any transport layer, including Transmission Control Protocol (TCP), User Datagram Protocol (UDP), or Stream Control Transmission Protocol (SCTP). SIP is also text-based protocol and can run with transfer protocols such as Hypertext Transfer Protocol (HTTP) or Simple Mail Transfer Protocol (SMTP). SIP can be used to create, modify, or terminate two-party unicast or multiparty multicast sessions.

In one implementation, a participation request message from video telephony callers 102a-n can be mediated by the video telephony gateway 112. In some implementations, the participation request message can include a SIP request such as a SIP INVITE message or some other SIP request like SIP REFER message. The SIP based participation request message can be either sent from video telephony callers 102a-n to the video telephony gateway 112 (an inbound call) or from the video telephony gateway 112 to video telephony callers 102a-n (an outbound call) via the network 115, thus establishing a call between the video telephony gateway 112 and video telephony callers 102a-n. In some implementations, the SIP based participation request message can transmit at least one of a SIP URI/URL or E.164 number that a video telephony gateway is reachable at, SIP URI/URL or E.164 number of the remote limited participant, or an authentication challenge for the called party. Once the SIP based participation request message is accepted by the called party, an end-to-end bearer communication path is established between the video telephony gateway and the remote limited participant.

In one example, when the remote limited participants using a SIP phone in communication with a network 115, the identity of the caller such as the caller's SIP URI/URL or E.164 is included in the SIP "from" header. The video telephony gateway returns a SIP 180 "ringing" response, and in turn triggers a message to the video collaboration server to determine how to handle the incoming call. Upon receiving the response from the video collaboration server, the video telephony gateway establishes a communication path between the remote limited participant and the appropriate live video streams within the video collaboration session. In other implementations, a SIP application programming interface (API) can be used to access different SIP services during a video collaboration session, including web-browsers, instant messages, and teleconferences.

Figure 5:
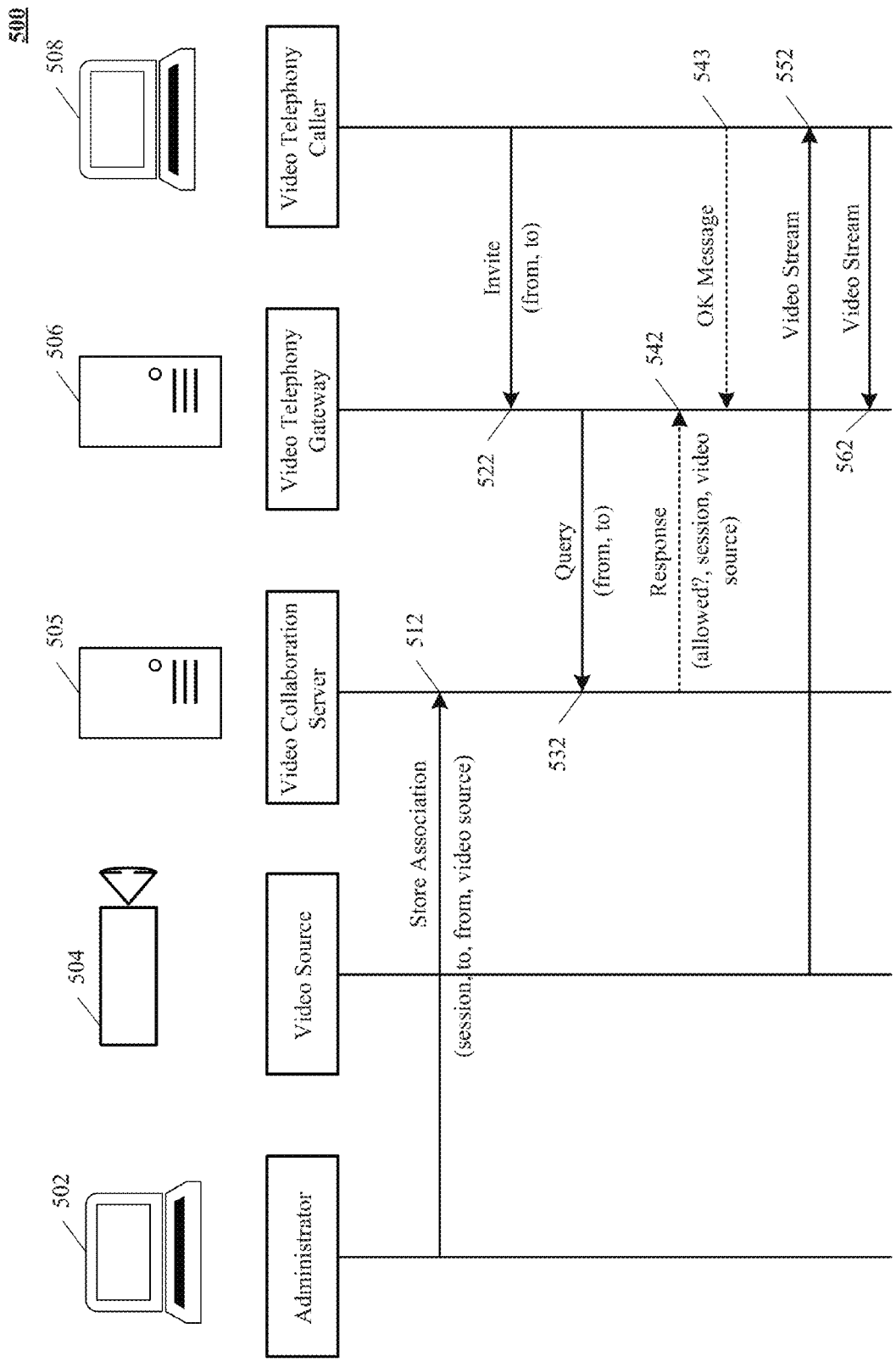
FIG. 5 depicts one implementation of a message sequence chart of distributing live streaming sources to remote limited participants of a video collaboration session in response to receiving an inbound call from the remote limited participants.

FIG. 5 depicts one implementation of a message sequence chart 500 of distributing live streaming sources to remote limited participants of a video collaboration session in response to receiving an inbound call from the remote limited participants. Other implementations may perform the exchanges in different orders and/or with different, fewer or additional exchanges than the ones illustrated in FIG. 5. Multiple exchanges can be combined in some implementations. For convenience, this chart is described with reference to the system that carries out a method. The system is not necessarily part of the chart.

At exchange 512, an administrator 502 of a video collaboration system provisions the video collaboration session with a visual collaboration server 505. In one implementation, provisioning includes specifying different parameters of a video interface template to be used in the video collaboration session, including at least one of listing or pre-registering the live streaming sources, participants, and remote limited participants, identifying positions and sizes of video feed windows of the live streaming sources, participants, and remote limited participants, assigning one or more live streaming sources to one or more participants and remote limited participants for automatic and immediate transmission upon connection.

At exchange 522, video telephony gateway 506 receives an inbound call request from a video telephony caller 508. In one implementation, the inbound call includes specific information such as a SIP "to" address identifying a specific video collaboration session and/or live video source along with identification credentials of the caller 508.

At exchange 532, video telephony gateway 506 parses the inbound call request and extracts the specific information described above and uses the specific information to issue a query to the visual collaboration server 505. The visual collaboration server 505 evaluates responsiveness of the specific information encapsulated in the query against the different parameters defined by the administrator during provisioning at exchange 512.

In one example, the evaluation includes comparing the credentials of the video telephony caller 508 against the participants and remote participants listed by the administrator at exchange 512. Another example includes checking if the pre-registered video sources match the ones used to initiate the call to the video telephony gateway 506.

At exchange 542, visual collaboration server 505 generates a response to the query issued by the video telephony gateway 506 and either adds or rejects the video telephony caller 508 to or from the video collaboration session. In one example, adding the caller to the video collaboration session is done by sending a SIP "OK" message 543 to the caller with SDP information for the video stream to be transmitted to the caller.

At exchange 552, live video source 504 broadcasts live streaming video to the video telephony caller 508.

At exchange 562, live video feed from the video telephony caller 508 is transmitted to the video telephony gateway 506 for incorporation in the video collaboration session.

In addition to allowing video calls to be made into a visual collaboration session, the video telephony gateway can allow participants within the visual collaboration session to initiate outbound video calls to include other participants and remote participants with video telephony capabilities in the collaboration session.

Figure 6:
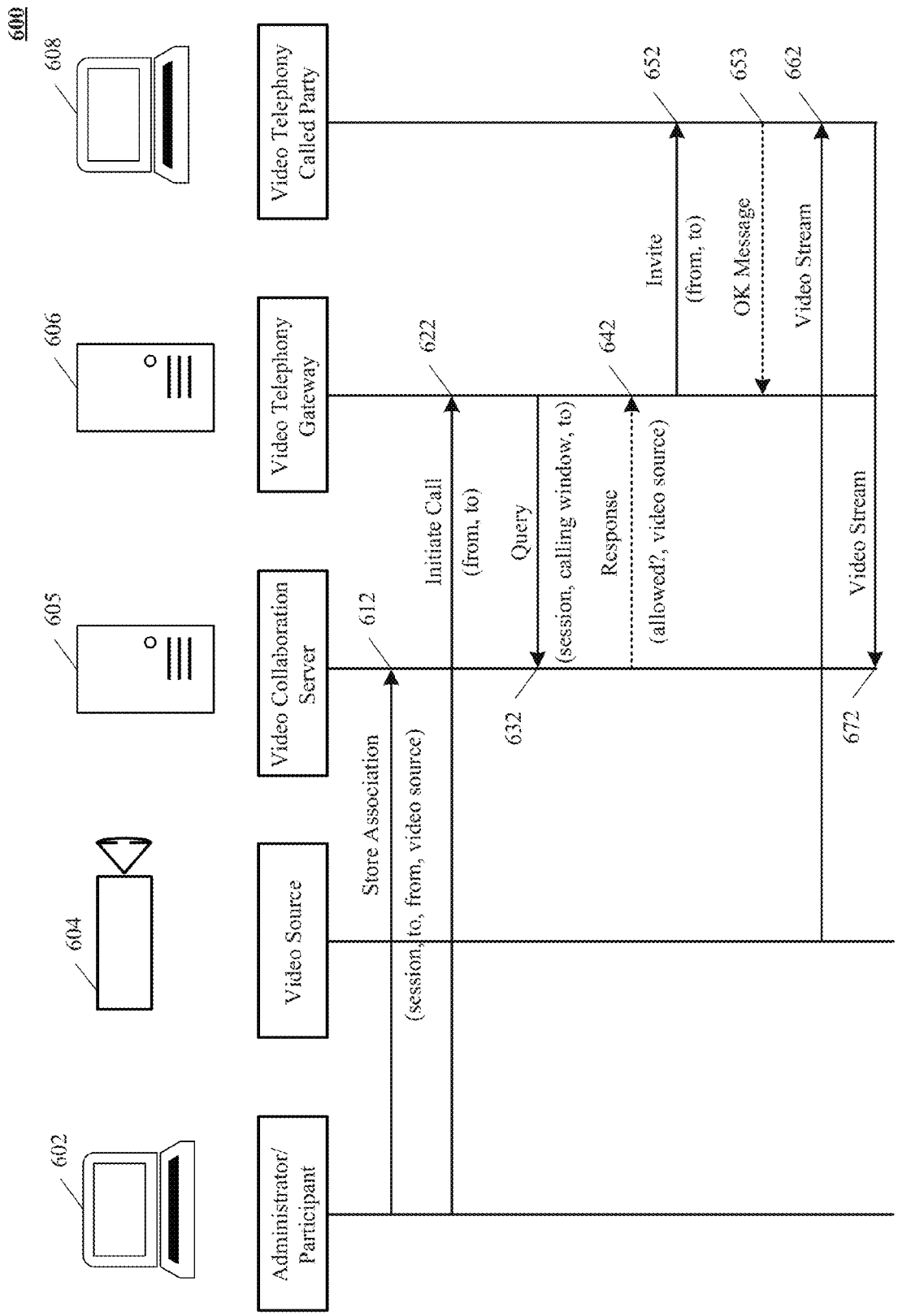
FIG. 6 illustrates one implementation of a message sequence chart of distributing live streaming sources to remote limited participants of a video collaboration session in response to initiating an outbound call to the remote limited participants.

FIG. 6 illustrates one implementation of a message sequence chart 600 of distributing live streaming sources to remote limited participants of a video collaboration session in response to initiating an outbound call to the remote limited participants. Other implementations may perform the exchanges in different orders and/or with different, fewer or additional exchanges than the ones illustrated in FIG. 6. Multiple exchanges can be combined in some implementations. For convenience, this chart is described with reference to the system that carries out a method. The system is not necessarily part of the chart.

At exchange 612, an administrator 602 of a video collaborative session provisions the video collaborative session with a visual collaboration server 605. In one implementation, provisioning includes specifying different parameters of a video interface template used to be used in the video collaboration session, including at least one of listing or pre-registering the live streaming sources, participants, and remote limited participants, identifying positions and sizes of video feed windows of the live streaming sources, participants, and remote limited participants, assigning one or more live streaming sources to one more participants and remote limited participants for automatic and immediate transmission upon connection.

At exchange 622, video telephony gateway 606 receives an outbound call request from a device 602 of participant in a video collaboration session directed at a video telephony caller 608. In one implementation, the outbound call includes specific information such as session identifier (ID) and/or video source identifier (ID), window within the video collaboration session in which to display the live video from the called party 608, along with telephony address of the called party 608 like "alice@company.com."

At exchange 632, video telephony gateway 606 parses the outbound call request and extracts the specific information described above and uses the specific information to issue a query to the visual collaboration server 605. The visual collaboration server 605 evaluates responsiveness of the specific information encapsulated in the query against the different parameters defined by the administrator during provisioning at exchange 612.

In one example, the evaluation includes comparing the address of the called party 608 against the participants and remote participants listed by the administrator at exchange 612. Another example includes checking if the called party 608 has permission to view the pre-registered video sources that will be transmitted when the call is established to the called party 608.

At exchange 642, visual collaboration server 605 generates a response to the query issued by the video telephony gateway 606 and either adds or rejects the video telephony caller 608 to or from the video collaboration session.

At exchange 652, video telephony gateway 606 initiates the outbound call request to the video telephony endpoint 608. In one implementation, the outbound call is initiated with a SIP "INVITE" message including the "from" and "to" SIP URIs and an initial SDP offer for a live video stream from the video collaboration session that will be transmitted to the called party when the call is established.

At exchange 653, an "OK" message is sent by the video telephony caller 608, which includes the SDP information of the video stream to be transmitted to the video telephony gateway at exchange 672.

At exchange 662, live video source 604 broadcasts live streaming video to the video telephony endpoint 608.

At exchange 672, live video feed from the video telephony caller 608 is transmitted to the video telephony gateway 606 for incorporation in the video collaboration session.

Figure 7:
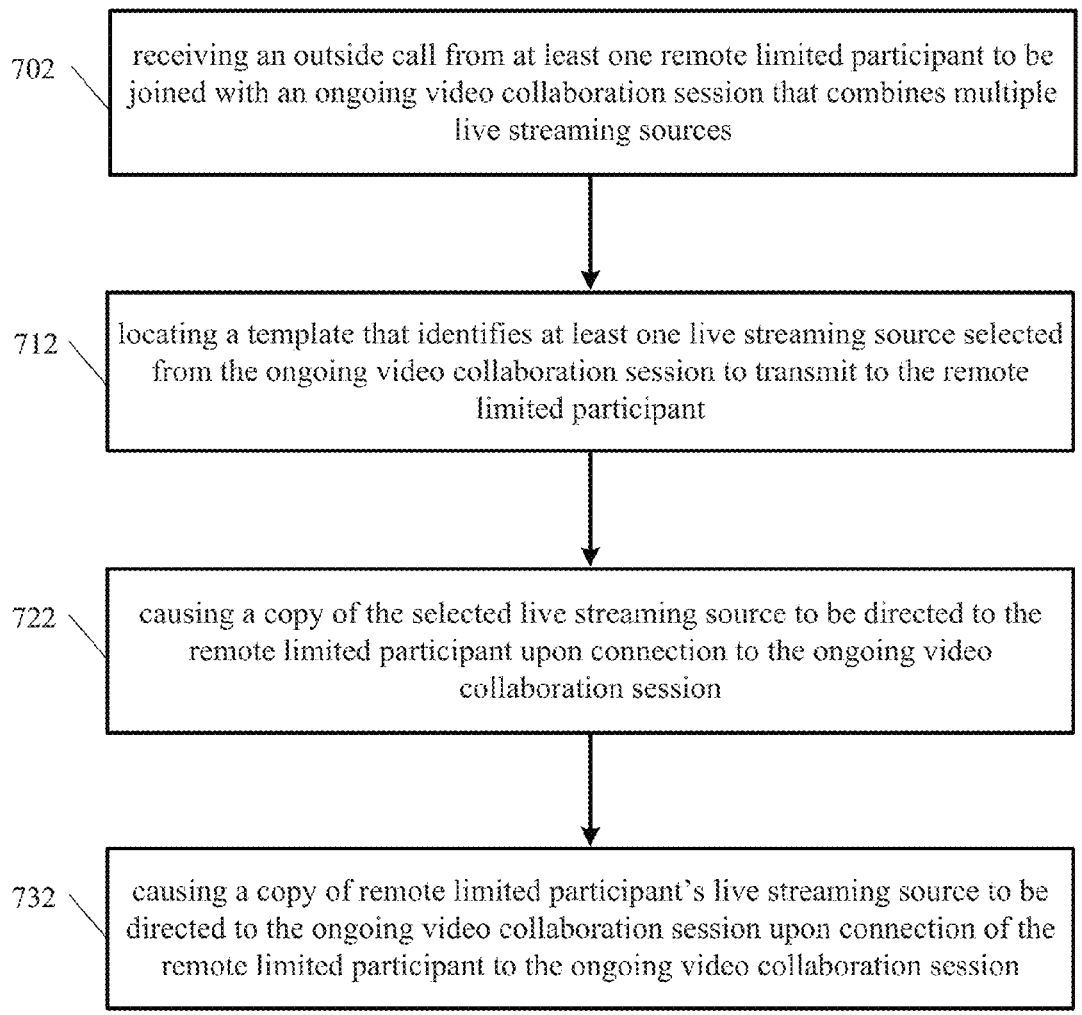
FIG. 7 is a flowchart showing a method of distributing live streaming sources to remote limited participants of a video collaboration session in response to receiving an outside call from the remote limited participants.

FIG. 7 is a flowchart showing a method 700 of distributing live streaming sources to remote limited participants of a video collaboration session in response to receiving an outside call from the remote limited participants. Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 702, an outside call is received from at least one remote limited participant to be joined with an ongoing video collaboration session that combines multiple live streaming sources. In one implementation, a menu of live streaming sources is provided for selection by the remote limited participant.

At action 712, a template that identifies at least one live streaming source selected from the ongoing video collaboration session to transmit to the remote limited participant is located. In one implementation, the template associated with the session controls the display position of the remote limited participant's live streaming source in the ongoing video collaboration session. In another implementation, a particular live streaming source is designated for immediate broadcast to the remote limited participant by dragging an interface object representing the outside call from the remote limited participant and dropping the interface object on an interface window used to stream the particular live streaming source.

In one implementation, at least one live streaming source is based on a telephony address specified by remote limited participant to connect to the ongoing video collaboration session. In another implementation, the identification of at least one live streaming source is based on user identification (ID) of the remote limited participant. In yet another implementation, the identification of at least one live streaming source is based on a device format of remote limited participant's device.

At action 722, a copy of the selected live streaming source is directed to the remote limited participant upon connection to the ongoing video collaboration session. In other implementations, a copy of the live streaming source is directed to a group of remote limited participants upon connection of the remote limited participants to the ongoing video collaboration session. In yet other implementations, a copy of remote limited participant's live streaming source is directed to the ongoing video collaboration session upon connection of the remote limited participant to the ongoing video collaboration session at action 732.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 8:
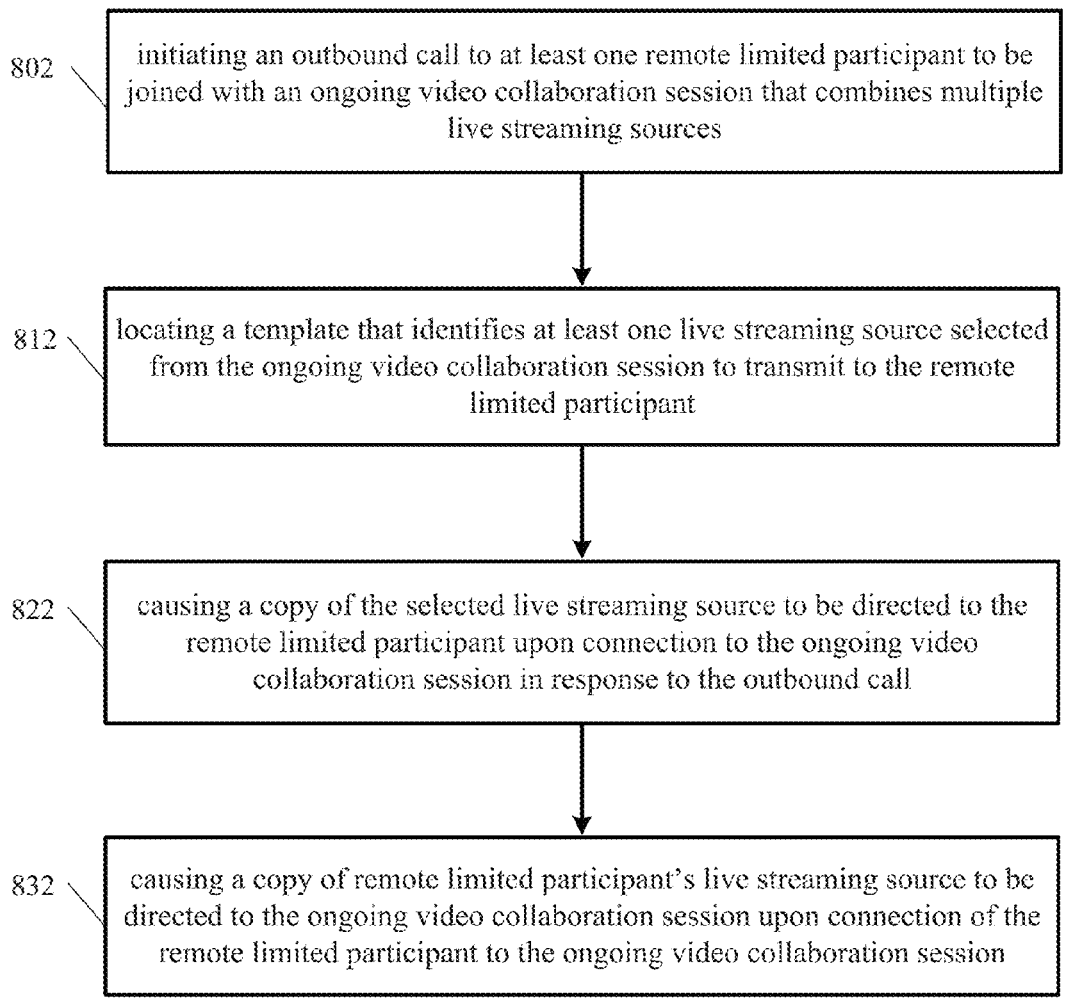
FIG. 8 illustrates one implementation of a method of distributing live streaming sources to remote limited participants of a video collaboration session in response to initiating an outbound call to the remote limited participants.

FIG. 8 illustrates one implementation of a method 800 of distributing live streaming sources to remote limited participants of a video collaboration session in response to initiating an outbound call to the remote limited participants. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 802, an outbound call is initiated to at least one remote limited participant to be joined with an ongoing video collaboration session that combines multiple live streaming sources. In one implementation, a menu of live streaming sources is provided for selection by the remote limited participant.

At action 812, a template that identifies at least one live streaming source selected from the ongoing video collaboration session to transmit to the remote limited participant is located. In one implementation that the template controls the display position of the remote limited participant's live streaming source in the ongoing video collaboration session. In another implementation, a particular live streaming source is designated for immediate broadcast to the remote limited participant by dragging an interface object representing the outside call from the remote limited participant and dropping the interface object on an interface window used to stream the particular live streaming source.

In one implementation, at least one live streaming source is based on a telephony address specified by remote limited participant to connect to the ongoing video collaboration session. In another implementation, the identification of at least one live streaming source is based on user identification (ID) of the remote limited participant. In yet another implementation, the identification of at least one live streaming source is based on a device format of remote limited participant's device.

At action 822, a copy of the selected live streaming source is directed to the remote limited participant upon connection to the ongoing video collaboration session in response to the outbound call. In other implementations, a copy of the live streaming source is directed to a group of remote limited participants upon connection of the remote limited participants to the ongoing video collaboration session. In yet other implementations, a copy of remote limited participant's live streaming source is directed to the ongoing video collaboration session upon connection of the remote limited participant to the ongoing video collaboration session at action 832.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 9 is a block diagram of an example computer system 900 to distribute live video feeds during a video collaboration session. Computer system 910 typically includes at least one processor 914 that communicates with a number of peripheral devices via bus subsystem 912. These peripheral devices can include a storage subsystem 924 including, for example, memory devices and a file storage subsystem, user interface input devices 922, user interface output devices 920, and a network interface subsystem 918. The input and output devices allow user interaction with computer system 910. Network interface subsystem 918 provides an interface to outside networks, including an interface to corresponding interface devices in other computer systems. Application server 920 can be a framework that allows the applications of computer system 900 to run, such as the hardware and/or software, e.g., the operating system.

User interface input devices 922 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 920 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 918 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 929 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem can use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of distribution of live streaming sources during a video collaboration session, the method including:
provisioning a template for an ongoing video collaboration session;
receiving an outside call from at least one remote limited participant to be joined with the ongoing video collaboration session which combines multiple live streaming sources;
accessing the template which identifies visual collaboration information and at least one live streaming source selected from the ongoing video collaboration session to transmit to the remote limited participant;
based on the template, causing a copy of the selected live streaming source to be directed to the remote limited participant upon connection to the ongoing video collaboration session, the live streaming source being a unidirectional live streaming source; and
further based on the template, causing a copy of a live stream from the remote limited participant to be directed only to the ongoing video collaboration session via a video telephony gateway.

2. The method of claim 1, further including basing the identification of the at least one live streaming source on a telephony address specified by the remote limited participant to connect to the ongoing video collaboration session.

3. The method of claim 1, further including basing the identification of the at least one live streaming source on a user identification (ID) of the remote limited participant.

4. The method of claim 1, further including basing the identification of the at least one live streaming source on a device format of a remote limited participant's device.

5. The method of claim 1, further including providing a menu of live streaming sources for selection by the remote limited participant.

6. The method of claim 1, where the copy of the remote limited participant's live stream is directed to the ongoing video collaboration session upon connection of the remote limited participant to the ongoing video collaboration session.

7. The method of claim 6, further including receiving instructions that control display position of the remote limited participant's live streaming source in the ongoing video collaboration session.

8. The method of claim 1, further including designating a particular live streaming source for immediate broadcast to the remote limited participant by:
   dragging an interface object representing the outside call from the remote limited participant; and
   dropping the interface object on an interface window used to stream the particular live streaming source.

9. The method of claim 1, further including causing the copy of the live streaming source to be directed to a group of remote limited participants upon connection of the remote limited participants to the ongoing video collaboration session.

10. A method of distribution of live streaming sources during a video collaboration session, the method including:
   receiving an outside call from at least one remote limited participant to be joined with an ongoing video collaboration session on a display wall that combines multiple live streaming sources, where the live streaming sources are information sources that broadcast unidirectional live video feeds;
   locating a template which identifies at least one live streaming source selected from the ongoing video collaboration session to transmit to the remote limited participant; and
   upon connection to the video collaboration session, automatically and immediately establishing a communication path between the at least one remote limited participant and the selected live streaming source based on the template.

11. The method of claim 10, where the live streaming sources are information sources that only broadcast unidirectional live video feeds.

12. The method of claim 10, further comprising sending a copy of a live stream from the remote limited participant only to a visual collaboration server for incorporation into the ongoing video collaboration session.

13. A video collaboration system, including:
   a video telephony gateway receiving inbound and outbound calls, where the inbound calls are from at least one remote limited participant to be joined with an ongoing video collaboration session that combines multiple live streaming sources and where the outbound calls are from a participant in the ongoing video collaboration session directed to the remote limited participant, where the multiple live streaming sources are unidirectional live video feeds of regions of interest;
   a visual collaboration server locating a template that identifies at least one live streaming source selected from the ongoing video collaboration session to transmit to the remote limited participant; and
   the visual collaboration server causing a copy of the selected live streaming source to be directed to the remote limited participant automatically and immediately upon connection to the ongoing video collaboration session based on the template.

14. The system of claim 13, further configured to base the identification of the at least one live streaming source on a telephony address specified by the remote limited participant to connect to the ongoing video collaboration session.

15. The system of claim 13, where the inbound and outbound calls are only received at the video telephony gateway.

16. The system of claim 13, further configured to base the identification of the at least one live streaming source on a device format of a remote limited participant's device.

17. The system of claim 13, further configured to cause a copy of the remote limited participant's live streaming source to only be sent to the video telephony gateway for direction to the ongoing video collaboration session upon connection of the remote limited participant to the ongoing video collaboration session.

18. The system of claim 17, further configured to receive instructions that control display position of the remote limited participant's live streaming source in the ongoing video collaboration session.

19. The system of claim 13, further configured to designate a particular live streaming source for immediate broadcast to the remote limited participant by:
   dragging an interface object on an interface window used to stream the particular live streaming source, the particular live streaming source overriding the selected live streaming source.

20. The system of claim 13, further configured to cause the copy of the live streaming source to be directed to a group of remote limited participants upon connection of the remote limited participants to the ongoing video collaboration session.

* * * * *